United States Patent [19]
Yamamura et al.

[11] Patent Number: 5,094,907
[45] Date of Patent: Mar. 10, 1992

[54] ELECTROMAGNETIC WAVE ABSORBING MATERIAL

[75] Inventors: Takemi Yamamura; Toshihiro Ishikawa; Masaki Shibuya, all of Ube, Japan

[73] Assignee: Ube Industries, Ltd., Yamaguchi, Japan

[21] Appl. No.: 550,221

[22] Filed: Jul. 10, 1990

Related U.S. Application Data

[62] Division of Ser. No. 240,585, Sep. 1, 1988, abandoned.

Foreign Application Priority Data

Sep. 4, 1987 [JP] Japan .................. 62-220233
Jul. 8, 1988 [JP] Japan .................. 63-168673

[51] Int. Cl.$^5$ .................. B32B 17/00; B32B 27/00
[52] U.S. Cl. .................. 428/285; 428/284; 428/286; 428/287; 428/292; 428/293; 428/367; 428/446; 428/480
[58] Field of Search .............. 428/364, 367, 284, 285, 428/286, 287, 292, 293, 294, 288, 446, 480; 501/88, 95, 97

[56] References Cited

U.S. PATENT DOCUMENTS

| | | | |
|---|---|---|---|
| 4,342,712 | 8/1982 | Yajima et al. | 525/477 X |
| 4,507,354 | 3/1985 | Ishikawa et al. | 428/367 X |
| 4,618,529 | 10/1986 | Yamamura et al. | 428/367 X |
| 4,663,229 | 5/1987 | Yajima et al. | 428/364 |
| 4,726,980 | 2/1988 | Ishikawa et al. | 428/367 |
| 4,752,525 | 6/1988 | Oyachi et al. | 428/364 X |

FOREIGN PATENT DOCUMENTS 0206536 12/1986 European Pat. Off. .
0207792 7/1987 European Pat. Off. .
2117569 10/1983 United Kingdom .

*Primary Examiner*—Lorraine T. Kendell
*Attorney, Agent, or Firm*—Wenderoth, Lind & Ponack

[57] ABSTRACT

This invention provides an electromagnetic wave absorbing material composed of a composite material comprising a fiber having a specific resistance of $10^{-2}$ to $10^2$ Ω.cm and a matrix, wherein the fiber is composed of an inorganic substance selected from the group consisting of i) an amorphous substance substantially composed of Si, M, C and O, ii) crystalline ultrafine particles substantially composed of β-SiC, C, MC, a solid solution of ⊕-SiC and MC and/or MC$_{1-x}$, *and having a particle diameter of not more than 500 Å, or optionally, an aggregate of the crystalline ultrafine particles, amorphous SiO$_2$ and amorphous MO$_2$,* and iii) a mixture of the above i) amorphous substance with the above ii) crystalline ultrafine particles or aggregate in which M denotes Ti or Zr, and X is more than 0 but less than 1.

14 Claims, No Drawings

ELECTROMAGNETIC WAVE ABSORBING MATERIAL

This application is a division of application Ser. No. 07/240,585 filed Sept. 1, 1988 (now abandoned).

FIELD OF THE INVENTION

This invention relates to an electromagnetic wave absorbing material usable as a structural material having high strength and elastic modulus and excellent heat resistance and absorbing electromagnetic waves in the range of from 500 MHz to 3,000 GHz.

DESCRIPTION OF THE PRIOR ART

Electromagnetic wave absorbing materials are used to prevent the microwave leakage in openings of miorowave-heat cookers, electrowave darkrooms, etc. Further, electromagnetic wave absorbing materials are used as a radar wave absorbing material to prevent a ship, airplane, etc., from being detected by a radar.

Several electromagnetic wave absorbing materials have been proposed.

Japanese Patent publication No. 31275/1978 discloses an electromagnetic wave absorbing material formed by incorporating carbon black and fine metal particles into a resin. This electromagnetic wave absorbing material has, however, low strength and elastic modulus, and therefore can not be used as a structural material.

Japanese Laid-Open Patent Publication No. 66699/1982 discloses an electromagnetic wave absorbing material made of a composite material consisting of a carbon fiber having a complex specific dielectric constant of $[\epsilon = (8 \sim 12) - j(3 \sim 5)]$ at 10 GHz of frequencies and a resin.

Since the carbon fiber exhibits metallic conduction, its specific resistance increases as the temperature rises. Hence, its electromagnetic wave absorption property lowers to a great extent. The electromagnetic wave absorbing material is required to have an unchanged eletromagnetic wave absorption property over a wide temperature range. From this viewpoint, the electromagnetic wave absorbing material described in the above Japanese Laid-Open Patent Publication is not practically satisfactory.

European Laid-Open Patent Publication 206536 describes an inorganic fiber-reinforced plastic composite material composed of plastics and an amorphous or microcrystal inorganic fiber consisting of silicon, carbon, titanium or zirconium and oxygen. However, said European Laid-Open Patent Publication describes nothing concerning the specific resistance of the inorganic fiber used, nor does it describe anything about the fact that a composite material composed of an inorganic fiber having a particular specific resistance and plastics can be used as an electromagnetic wave absorbing material.

SUMMARY OF THE INVENTION

The object of this invention is to provide an electromagnetic wave absorbing material which is excellent in electromagnetic wave absorption property in a wide temperature range.

Another object of this invention is to provide an electromagnetic wave absorbing material which has suitable strength and elastic modulus for use as a structural material.

According to this invention, there is provided an electromagnetic wave absorbing material composed of a composite material comprising a fiber having a specific resistance of $10^{-2}$ to $10^2$ $\Omega\cdot$cm and a matrix, wherein said fiber is composed of an inorganic substance selected from the group consisting of i) an amorphous substance substantially composed of Si, M, C and O, ii) crystalline ultrafine particles substantially composed of $\beta$-SiC, C, MC, a solid solution of $\beta$-SiC and MC and/or $MC_{1-x}$, and having a particle diameter of not more than 500 Å, or optionally, an aggregate of the crystalline ultrafine particles, amorphous $SiO_2$ and amorphous $MO_2$, and iii) a mixture of the above i) amorphous substance with the above ii) crystalline ultrafine particles or aggregate in which M denotes Ti or Zr and X is greater than 0 but less than 1.

DETAILED DESCRIPTION OF THE INVENTION

This invention provides an electromagnetic wave absorbing material composed of a composite material comprising a fiber and a matrix and effectively absorbing microwaves in the range of from 500 MHz to 3,000 GHz.

The fiber usable in the electromagnetic wave absorbing material of this invention can be prepared, for example, according to a method described in U.S. Pat. Nos. 4,342,712 and 4,315,742.

The above fiber can be prepared by, first, reacting polycarbosilane composed mainly of $(Si-CH_2)$ bond units and having a number average molecular weight of 200 to 10,000 and titanium alkoxide or zirconium alkoxide under inert atmosphere under heat to bond at least a part of the silicon atoms of the polycarbosilane with titanium or zirconium of the above alkoxides through an oxygen atom whereby polytitanocarbosilane or polyzirconocarbosilane having a number average molecular weight of 1,000 to 50,000 is formed, then preparing a spinning solution of the polytitanocarbosilane or polyzirconocarbosilane, spinning a fiber from the solution, rendering the fiber infusible, and finally subjecting the infusible fiber to heat treatment under vacuum, inert gas or reducing gas atmosphere at 1,300° to 1,500° C. As the temperature for the above heat treatment increases within the above temperature range, the specific resistance of the resultant fiber decreases.

The fiber usable in the electromagnetic wave absorbing material of this invention can also be prepared by the other method described in U.S. Pat. Nos. 4,342,712 and 4,315,742.

That is, the method described in these patents comprises heating polycarbosilane having a number average molecular weight of 500 to 1,000 and polytitanocarbosilane or polyzirconocarbosilane having a number average molecular weight of 500 to 1,000 in an organic solvent under inert gas atmosphere, to bond at least a part of the silicon atoms of the polycarbosilane with silicon atoms, titanium atoms or zirconium atoms of the polytitanocarbosilane or polyzirconocarbosilane through an oxygen atom, whereby an organic silicon polymer is prepared, then preparing a spinning solution of this polymer, spinning a fiber from the solution, rendering the spun fiber infusible, and finally subjecting the infusible fiber to heat treatment under vacuum, inert gas or reducing gas atmosphere at 1,300° to 1,500° C.

The proportions of the elements in the fiber are, in general, as follows.

Si: 28 to 60% by weight
C: 23 to 60% by weight
Ti or Zr: 0.5 to 30% by weight
O: 1 to 30% by weight No special limitation is imposed on the form of the fiber. However, a continuous fiber having a diameter of 5 to 15 μm is preferable in order to obtain an electromagnetic wave absorbing material having good mechanical property and electromagnetic wave absorbing property.

Examples of the fibers are those which are monoaxially or multiaxially oriented, or which are various fabrics such as plain weave, satin elastic webbing, twilled weave, leno cloth, spiral weave, three dimensional weave, etc.

The matrix for use in the electromagnetic wave absorbing material may be of plastics or ceramics.

Examples of the plastic matrix includes epoxy resin, polyurethane resin, polyamide resin, polycarbonate resin, silicon resin, phenoxy resin, polyphenylene sulfide resin, fluorine resin, hydrocarbon resin, halogen-containing resin, acrylic acid-type resin, acrylonitrile-/butadiene/styrene resin, and ultrahigh molecular weight polyethylene.

Among the above plastic matrices, epoxy resin is preferably used. The epoxy resin is a resin composition composed of polyepoxide, curing agent, curing catalyst, etc.

Examples of the polyepoxide includes a glycidyl compound of bisphenols A, F and S, a glycidyl compound of cresol novolak or phenol novolak, alicyclic polyepoxide, etc. The other examples of the polyepoxide include a glycidyl compound of polyphenol, polyhydric alcohol or aromatic amine.

Among these polyepoxides, generally used are a glycidyl compound of bisphenol A, a glycidyl compound of diiminodiphenyl methane and a glycidyl compound of aminophenol. When the electromagnetic wave absorbing material of this invention is used as a member material requiring high functions such as a primary structural material of airplanes, it is preferable to use glycidyl compounds of polyfunctional amines such as diiminodiphenyl methane.

Examples of the ceramic matrix include carbide ceramics such as silicon carbide, titanium carbide, zirconium carbide, niobium carbide, tantalum carbide, boron carbide, chromium carbide, tungsten carbide, molybdenum carbide, etc.; nitride ceramics such as silicon nitride, titanium nitride, zirconium nitride, vanadium nitride, niobium nitride, tantalum nitride, boron nitride, hafnium nitride, etc.; oxide ceramics such as alumina, magnesia, mullite, cordierite, etc.

In the case when the matrix is of plastic, the composite material may be prepared by the hand lay up method, matched metal die method, break away method, filament winding method, hot press method, autobreak method, continuous drawing method, etc.

When the matrix is of ceramic, there is a method of preparing an aggregate of a fiber and ceramic powder and sintering the aggregate. For the preparation of the above aggregate, there can be employed those methods of embedding a ceramic powder alternately, filling a ceramic powder in the spaces formed among prearranged fibers, etc.

The electromagnetic wave absorbing material of this invention has a structure formed, in general, by arranging the above fibers of various forms in the matrix to form composites and laminating a plurality of the resultant composites integrally. Especially, preferable is a structure formed by a method which comprises laminating a plurality of composites which are prepared by arranging fibers monoaxially. Examples of the lamination method includes those of laminating composites such that the directions of the fibers are in agreement, laminating composites such that the fiber direction of one composite is at right angles to the fiber direction of another composite, alternately, etc. The latter method is preferable to obtain good electromagnetic wave absorbing property.

The electromagnetic wave absorbing material has a thickness of, in general, 1 to 10 mm. The proportion of the fiber in the electromagnetic wave absorbing material is, preferably, 30 to 80% by volume, especially preferably 45 to 65% by volume.

The electromagnetic wave absorbing material may have a structure formed by laminating an electromagnetic wave transmitting material on the surface through which electromagnetic waves come.

It is well known that when an electromagnetic wave contacts to a material which has an extremely larger dielectric constant than the air, reflection of the electromagnetic wave on the surface layer increases. In the electromagnetic wave absorbing material, it is required that the amount of reflection on the surface be very small. Further, if the lamination structure is so formed as to make the dielectric constants gradually larger from the surface inward, the above reflection of the electromagnetic wave on the surface layer decreases to a great extent.

Examples of the electromagnetic wave transmitting material for use in combination with the electromagnetic wave absorbing material include glass fiber- or aromatic polyamide fiber-reinforced polyester resins.

Preferably usable electromagnetic wave transmitting material is a composite material which comprises a fiber composed of a substantially amorphous substance made of silicon, carbon, titanium or zirconium and oxygen and having a specific resistance of $10^5$ to $10^{10}$ Ω·cm and a matrix.

The above fiber may be prepared in the same way as in the preparation of the fiber for the electromagnetic wave absorbing material except that the infusible fiber is subjected to heat treatment at 800° to 1,300° C. and that the time period for the heating is suitably selected.

The proportions of the above elements for use in the electromagnetic wave transmitting material are, in general, as follows.

Si: 26 to 58% by weight
C: 25 to 62% by weight
Ti or Zr: 0.5 to 30% by weight
O: 1 to 30% by weight The matrix and the composite of the fiber and matrix are prepared in the same way as in the preparation of those for the electromagnetic wave absorbing material.

The electromagnetic wave transmitting material layer formed by laminating said material on the electromagnetic wave absorbing material usually has a thickness of 0.1 to 5 mm. And the proportion of the fiber in the electromagnetic wave transmitting material is preferably, 30 to 80% by volume, especially 45 to 65% by volume.

The electromagnetic wave absorbing material can absorb microwaves of 500 MHz to 3,000 GHz, particularly microwaves of 2 to 20 GHz. The fiber in the electromagnetic wave absorbing material of this invention has semiconductor type property, very small activation energy, 0.01 eV, of electric conductivity and no change in the electromagnetic wave absorbing characteristic even with temperature changes. Therefore, the electromagnetic wave absorbing material of this invention exhibits excellent electromagnetic wave absorbing performance over a wide temperature range. Further, the electromagnetic wave absorbing material of this invention has high strength and elastic modulus and excellent heat resistance, and therefore, can be used as a primary structural material for ships, airplanes, etc.

EXAMPLES

The following Examples illustrate this invention. In the Examples, the reflection attenuation amount of an electromagnetic wave in an electromagnetic wave absorbing material was measured with regard to a 22.86 mm × 10.16 mm 2.00 mm sample by the use of an S-parameter measuring apparatus made by Yokogawa-Hewlett-Packard, Ltd. The apparatus consists of an S-parameter measuring device HP8515A, network analayzer HP8510 and synthesized sweeper HP8340A. The reflection attenuation amount (db) of an electromagnetic wave absorbing material was measured at 25° C.

REFERENTIAL EXAMPLE 1

2.5 l of anhydrous xylene and 400 g of sodium were heated under a nitrogen gas current up to the boiling point of xylene, and 1 l of dimethylchlorosilane was added dropwise over 1 hour. After the addition, the mixture was refluxed under heat for 10 hours to form a precipitate. The precipitate was filtered, and washed with methanol and then with water to give 420 g of a white powder of polydimethylsilane.

The above polydimethylsilane was charged into a flask having a gas introducing tube, stirrer, condenser and distillation outlet tube, and treated under heat at 420° C. under nitrogen gas current with stirring, to give 350 g of a colorless transparent and a little viscous liquid in a distillate receptor. The liquid had a number average molecular weight, measured by vapor pressure infiltration method, of 470. IR spectrum measurement showed that this substance was an organic silicon polymer having a total number of (Si—$CH_2$) bond units/total number of (Si—Si) bond units ratio of 1:3.

3 g of polyborodiphenylsiloxane was added to 100 g of the above organic silicon polymer, and the mixture was thermally condensed at 350° C. to give a polycarbosilane having a main chain skeleton mainly composed of carbosilane units of formula (Si—$CH_2$) and having a hydrogen atom and methyl group attached to the silicon atom of the carbosilane unit.

Tetrabutoxysilane was added to the resultant polycarbosilane, and the mixture was crosslinkage-polymerized in nitrogen atmosphere at 340° C. to give a polytitanocarbo-silane composed of 100 parts of (Si—Si) units and 10 parts of (Ti—O) units. This polymer was melt-spun, and the spun fiber was treated in the air at 190° C. so as to render it infusible, and then fired in nitrogen atmosphere at 1,500° C.

The resultant fiber (fiber[I]) had a diameter of 10 μm, tensile strength of 300 kg/$mm^2$, tensile elastic modulus of 16 t/$mm^2$ and specific resistance of 1.5 Ω·cm.

REFERENTIAL EXAMPLE 2

The procedure of Referential Example 1 was repeated except that a fiber which was rendered infusible in Referential Example 1 was fired at 1,200° C., and as a result, a fiber [II] was obtained.

The resultant fiber [II] had a diameter of 10 μm, tensile strength of 280 kg/$mm^2$, tensile elastic modulus of 15.5 t/$mm^2$ and specific resistance of $2 \times 10^5$ Ω·cm.

REFERENTIAL EXAMPLE 3

The procedure of Referential Example 1 was repeated except that a fiber which was rendered infusible in Referential Example 1 was fired at 1,050° C., and as a result, a fiber [II] was obtained.

The resultant fiber [II] had a diameter of 10.5 μm, tensile strength of 260 kg/$mm^2$, tensile elastic modulus of 15 t/$mm^2$ and specific resistance of $3 \times 10^7$ Ω·cm.

REFERENTIAL EXAMPLE 4

The procedure of Referential Example 1 was repeated except that a fiber which was rendered infusible in Referential Example 1 was fired at 1,400° C., and as a result, a fiber [II] was obtained.

The resultant fiber [II] had a diameter of 10 μm, tensile strength of 305 kg/$mm^2$, tensile elastic modulus of 16.5 t/$mm^2$ and specific resistance of 40 Ω·cm.

REFERENTIAL EXAMPLE 5

Zirconiumtetrabutoxide was added to a polycarbosilane prepared in the same way as in Referential Example 1, and the mixture was crosslinkage-polymerized in nitrogen atmosphere at 250 ° C. to give a polyzirconocarbosilane composed of 100 parts of (Si—$CH_2$) units and 10 parts of (Zr—O) units. This polymer was melt-spun, and the spun fiber was treated in the air at 190° C. so as to render it infusible and then fired in nitrogen atmosphere at 1,500° C.

The resultant fiber (fiber [V]) had a diameter of 10 μm, tensile strength of 310 kg/$mm^2$, tensile elastic modulus of 16.5 t/$mm^2$ and specific resistance of 2.0 Ω·cm.

EXAMPLE 1

100 parts by weight of bisphenol A-type epoxy resin (XB 2879A made by Ciba Geigy) and 20 parts by weight of dicyanamide curing agent (XB 2879B made by Ciba Geigy) were uniformly mixed with each other, and then the mixture was dissolved in a methylcellulose/acetone (1:1 by weight) mixed solvent to prepare a solution of 28% by weight of the above mixture in the above mixed solvent.

The fiber [I] was immersed in the above solution, then taken up monodirectionally by using a drum winder and heated in a heated air-circulating oven at 100° C. for 14 minutes to prepare a prepreg in the semi-cured state. The prepreg had a resin content of 50% by volume and thickness of 0.2 mm.

11 sheets of the prepreg were laminated such that the direction of the fiber of one sheet was at right angles to the direction of the fiber of another sheet adjacent thereto, and the laminate was press-shaped at 130° C. by a press pressure of 11 kg/$cm^2$ for 90 minutes to give a composite A having a size of 250 mm × 250 mm × 2 mm.

Separately, the above procedure was repeated except for the use of the fiber [II] to prepare a prepreg having a resin content of 50% by volume and thickness of 0.2 mm. Then, 16 sheets of said prepreg were used and the above procedure was repeated to give a composite B having a size of 250 mm×250 mm×2 mm.

A composite A' and composite B' each having a size of 22.86 mm×10.16 mm×2 mm were taken from the above composite A and B by cutting them off, and these two composites were adhered to each other by an epoxy solution used in preparation of the prepreg such that the directions of the fibers were arranged in the same direction, to prepare an electromagnetic wave absorbing material.

When a microwave was introduced into the above electromagnetic wave absorbing material from the side of the composite containing the fiber [II], said material exhibited a reflection attenuation amount of not less than 15 db (reflectance of not more than 3.2%) in the frequency region of 5 to 20 GHz. Said material, in a similar measurement at 150° C., showed reflection attenuation amounts which were about the same as the above value.

The above electromagnetic wave absorbing material had a flexural strength of 102 kg/mm$^2$ and tensile strength of 95 kg/mm$^2$ when measured in the fiber direction.

EXAMPLE 2

Example 1 was repeated except that the fiber [II] was used in place of the fiber [II], to prepare a composite C.

Then, an electromagnetic wave absorbing material was prepared from the above composite C and the composite A obtained in Example 1 in the same way as in Example 1.

When a microwave was introduced into the above electromagnetic wave absorbing material from the side of the composite containing the fiber [II], said material exhibited a reflection attenuation amount of 40 db at 10 GHz.

The above electromagnetic wave absorbing material had a flexural strength of 108 kg/mm$^2$ and tensile strength of 97 kg/mm$^2$ when measured in the fiber direction.

EXAMPLE 3

Example 1 was repeated except that the fiber [III] was used in place of the fiber [I], to prepare a prepreg having a resin content of 50% by volume and thickness of 0.2 mm. The procedure of Example 1 was repeated except that 16 sheets of the above prepreg was used to obtain an electromagnetic wave absorbing material composed of a composite D having a size 250 mm×250 mm×3 mm.

When a microwave was introduced into the above electromagnetic wave absorbing material, said material exhibited a reflection attenuation amount of 30 db at 10 GHz.

The above electromagnetic wave absorbing material had a flexural strength of 105 kg/mm$^2$ and tensile strength of 96 kg/mm$^2$ when measured in the fiber direction.

EXAMPLE 4

Example 1 was repeated except that the fiber [V] was used in place of the fiber [I], to prepare an electromagnetic wave absorbing material.

When a microwave was introduced into the above electromagnetic wave absorbing material from the side of the composite containing the fiber [II], said material exhibited a reflection attenuation amount of not less than 14 db in the frequency region of 5 to 20 GHz.

The above electromagnetic wave absorbing material had a flexural strength of 105 kg/mm$^2$ and tensile strength of 96 kg/mm$^2$ when measured in the fiber direction.

What we claim is:

1. An electromagnetic wave absorbing structural material comprising a composite of a plurality of laminated layers of
   an electromagnetic wave absorbing material composed of a composite material comprising a fiber having a specific resistance of $10^{-2}$ to $10^2$ $\Omega$-cm and a matrix, wherein the fiber is composed of an inorganic substance selected from the group consisting of
   i) an amorphous substance substantially composed of Si, M, C and O,
   ii) crystalline ultrafine particles substantially composed of $\beta$-SiC, C, MC, and at least one member selected from (a) $MC_{1-x}$ and (b) a solid solution of $\beta$-SiC and MC, and having a particle diameter of not more than 500 Å, or an aggregate of the crystalline ultrafine particles, amorphous $SiO_2$ and amorphous $MO_2$, and
   iii) a mixture of the above i) amorphous substance with the above ii) crystalline ultrafine particles or aggregate in which M denotes Ti or Zr, and X is more than 0 but less than 1, and
   an electromagnetic wave transmitting material laminated on the surface of said composite.

2. A structural material according to claim 1 wherein in the electromagnetic wave absorbing material the composite material absorbs electromagnetic waves in the range of from 500 MHz to 3000 GHz.

3. A structural material according to claim 1 wherein in the electromagnetic wave absorbing material the fiber is one obtained by carrying out the spinning of polytitanocarbosilane or polyzirconocarbosilane having a number average molecular weight of 1,000 to 50,000, rendering the spun fiber infusible and heating the infusible fiber under vacuum, inert gas or reducing gas atmosphere at 1,300° to 1,500° C.

4. A structural material according to claim 1 wherein in the electromagnetic wave absorbing material the fiber is one obtained by carrying out the spinning of an organic silicon polymer obtained by heating polycarbosilane having a number average molecular weight of 500 to 1,000 and polytitanocarbosilane or polyzirconocarbosilane having a number average molecular weight of 500 to 1,000 in an organic solvent under inert gas atmosphere, treating the spun fiber so as to render it infusible and heating the infusible fiber under vacuum, inert gas or reducing gas at 1,300° to 1,500° C.

5. A structural material according to claim 1 wherein in the electromagnetic wave absorbing material the proportions of elements in the fiber are as follows:
   Si: 28 to 60% by weight
   C: 23 to 60% by weight
   Ti or Zr: 0.5 to 30% by weight
   O: 1 to 30% by weight.

6. A structural material according to claim 1 wherein in the electromagnetic wave absorbing material the fiber is a continuous inorganic fiber having a diameter of 5–15 μm.

7. A structural material according to claim 1 wherein in the electromagnetic wave absorbing material the matrix is of plastic or ceramic.

8. A structural material according to claim 1 wherein in the electromagnetic wave absorbing material the proportion of the fiber in the composite material is 30 to 80% by volume.

9. A structural material according to claim 1 wherein the electromagnetic wave transmitting material is a glass fiber- or aromatic polyamide fiber-reinforced polyester resin.

10. A structural material according to claim 1 wherein the electromagnetic wave transmitting material is composed of a substantially amorphous fiber made of silicon, carbon, titanium or zirconium and oxygen and having a specific resistance of $10^5$ to $10^{10}$ $\Omega \cdot$cm and a matrix.

11. A structural material according to claim 10 wherein the substantially amorphous fiber is one obtained by carrying out the spinning of polytitanocarbosilane or polyzirconocarbosilane having a number average molecular weight of 1,000 to 50,000, rendering the spun fiber infusible and heating the infusible fiber under vacuum, inert gas or reducing gas atmosphere at 800° to 1,300° C.

12. A structural material according to claim 10 wherein the substantially amorphous fiber is one obtained by carrying out the spinning of an organic silicone polymer obtained by heating polycarbosilane having a number average molecular weight of 500 to 1,000 and polytitanocarbosilane or polyzirconocarbosilane having a number average molecular weight of 500 to 1,000 in an organic solvent under inert gas atmosphere, treating the spun fiber so as to render it infusible and heating the infusible fiber under vacuum, inert gas or reducing gas atmosphere at 800° to 1,300° C.

13. A structural material according to claim 10 wherein the proportions of elements in the substantially amorphous fiber are as follows:
Si: 28 to 58% by weight
C: 25 to 62% by weight
Ti or Zr: 0.5 to 30% by weight
O: 1 to 30% by weight.

14. A structural material according to claim 10 wherein the proportion of the fiber in the electromagnetic wave transmitting material is 30 to 80% by volume.

* * * * *